US012136844B2

(12) United States Patent
Kuznetsov

(10) Patent No.: US 12,136,844 B2
(45) Date of Patent: Nov. 5, 2024

(54) ENERGY STORAGE POWER SOURCE USING A WOUND-ROTOR INDUCTION MACHINE (WRIM) TO CHARGE AND DISCHARGE ENERGY STORAGE ELEMENTS (ESEs)

(71) Applicant: Raytheon Company, Tewksbury, MA (US)

(72) Inventor: Stephen B. Kuznetsov, Marlboro, MA (US)

(73) Assignee: Raytheon Company, Tewksbury, MA (US)

(*) Notice: Subject to any disclaimer, the term of this patent is extended or adjusted under 35 U.S.C. 154(b) by 385 days.

(21) Appl. No.: 17/557,758

(22) Filed: Dec. 21, 2021

(65) Prior Publication Data
US 2023/0198283 A1 Jun. 22, 2023

(51) Int. Cl.
*H02J 7/14* (2006.01)
*H02J 7/00* (2006.01)
*H02J 7/02* (2016.01)

(52) U.S. Cl.
CPC .............. *H02J 7/14* (2013.01); *H02J 7/0013* (2013.01); *H02J 7/02* (2013.01)

(58) Field of Classification Search
CPC .... H02J 7/14; H02J 7/0013; H02J 7/02; H02J 2207/20; H02J 3/30; H02J 3/32
See application file for complete search history.

(56) References Cited

U.S. PATENT DOCUMENTS

| 9,531,289 B2 | 12/2016 | Kuznetsov |
| 10,958,254 B1 | 3/2021 | Kuznetsov |
| 11,616,378 B2 | 3/2023 | Kuznetsov |
| (Continued) | | |

FOREIGN PATENT DOCUMENTS

| JP | S6377400 | 4/1988 |
| WO | 2023122084 | 6/2023 |
| WO | 2023129733 | 7/2023 |

OTHER PUBLICATIONS

"International Application Serial No. PCT US2022 053501, International Search Report mailed Apr. 5, 2023", 4 pgs.
(Continued)

Primary Examiner — David V Henze-Gongola
(74) Attorney, Agent, or Firm — Schwegman Lundberg & Woessner, P.A.

(57) ABSTRACT

A stored energy power source uses a wound-rotor induction machine (WRIM) to receive energy from an external source, store the energy in N energy storage elements (ESEs) via tertiary windings, and discharge the ESEs to deliver energy via a secondary winding to a load producing output. Each discharging ESE contributes to a total flux at the secondary winding to sum the individual ESEs voltages. These voltages can be stepped up or down by a transformation ratio between the secondary winding and each of the tertiary windings. A flywheel may be coupled to the secondary to store and delivery energy. Load factor power control can be used to stabilize the output voltage. The source may be configured to allow for the bi-directional flow of energy between an external power source, the ESEs, the flywheel and the load. The WRIM provides a safe, reliable and efficient system to provide high-level AC and DC output voltages.

20 Claims, 15 Drawing Sheets

(56) References Cited

U.S. PATENT DOCUMENTS

| | | |
|---|---|---|
| 11,929,619 B2 * | 3/2024 | Kuznetsov .............. H02J 3/32 |
| 2006/0066104 A1 | 3/2006 | Melfi |
| 2019/0036336 A1 * | 1/2019 | Kuznetsov ............ H02K 7/025 |
| 2019/0115758 A1 | 4/2019 | Orban et al. |
| 2019/0296582 A1 * | 9/2019 | Jacobson ............ H02M 7/5387 |
| 2020/0395764 A1 * | 12/2020 | Kuznetsov .............. H02J 3/32 |
| 2021/0344331 A1 | 11/2021 | Kuznetsov et al. |
| 2023/0216302 A1 | 7/2023 | Kuznetsov |

OTHER PUBLICATIONS

"International Application Serial No. PCT US2022 053501, Written Opinion mailed Apr. 5, 2023", 6 pgs.
"International Application Serial No. PCT US2022 054373, International Search Report mailed Apr. 11, 2023", 4 pgs.
"International Application Serial No. PCT US2022 054373, Written Opinion mailed Apr. 11, 2023", 7 pgs.
"C-56 Thyristor Power Systems", Westinghouse Electric Corporation, (Jul. 1971), 26 pgs.
Alger, Philip L., "Speed-Torque-Current Relations", Induction Machines Their Behavior and Uses, Second Edition, (1970), 261-265.
Kloss, Albert, "Power Balance in Three-Phase Bridge Converters", A Basic Guide to Power Electronics, (1984), 100-115.
"U.S. Appl. No. 17/567,611, Notice of Allowance mailed Oct. 30, 2023", 10 pgs.
"U.S. Appl. No. 17/567,611, 312 Amendment filed Jan. 26, 2024", 12 pgs.
"U.S. Appl. No. 17/567,611, PTO Response to Rule 312 Communication mailed Feb. 8, 2024", 2 pgs.

* cited by examiner

| | |
|---|---|
| PRIMARY WINDING | 12 POLES |
| INPUT POWER AS MOTOR | 2850 KW/3032 KVA |
| INPUT POWER FACTOR AND CURRENT | PF = 0.94, CURRENT = 421 AMPS RMS |
| INPUT VOLTAGE & FREQUENCY | 4160 VOLTS L-L, 3 PHASE, 750 HZ |
| MAXIMUM SHAFT SPEED | 7500 RPM* |
| PRIMARY SLOTS/COILS | 72/72 |
| STATOR BORE | 19.0 INCH |
| STATOR OUTER DIAMETER | 28.5 INCH |
| RADIAL AIRGAP | 0.070 INCH |
| SLOTS/POLE/PHASE | 2 |
| AIRGAP MEAN FLUX DENSITY | 1.2 TESLA RMS |
| PRIMARY CURRENT LOADING | 35,000 A.T./METER PERIPHERY |
| MAXIMUM FORCE DENSITY | 42,000 N/SQ. M. |
| WINDING TYPE | DOUBLE LAYER, DIAMOND-SHAPED COPPER COILS |
| WINDING LAYOUT | 24 COILS IN SERIES/PHASE |
| TEMPERATURE RISE OF WINDING, INSULATION CLASS | 160 DEGREES C, NEMA CLASS H |
| TERMINAL CONNECTION | WYE |
| VOLTS PER COIL | 100 VOLTS RMS |
| * ROTOR SPEED IS VARIABLE WITH FLYWHEEL | MAIN OPERATING RANGE 3000-7500 RPM |

FIG. 8A

| | |
|---|---|
| SECONDARY OR ROTOR WINDING | 12 POLES |
| INPUT/OUTPUT POWER, MOTOR OR GENERATOR MODE | 3000 kVA, 3-PHASE |
| MAXIMUM ENERGY INPUT OR OUTPUT | 96 MJ |
| PHASE CURRENT | 1155 A RMS |
| OUTPUT VOLTAGE & FREQUENCY | 1500 VOLTS RMS L-L, 750 HZ |
| VOLTAGE AFTER OUTPUT RECTIFICATION | 2020 VDC |
| MAXIMUM SHAFT SPEED | 7500 RPM |
| SECONDARY SLOTS & COILS | 90/90 |
| ROTOR DIAMETER | 18.87 INCH |
| OVERALL ROTOR LENGTH | 30.0 INCH |
| RADIAL AIRGAP | 0.070 INCH |
| SLOTS/POLE/PHASE | q = 2.5 FRACTIONAL SLOT WINDING |
| AIRGAP MEAN FLUX DENSITY | 1.2 TESLA RMS |
| CURRENT LOADING | 34,000 A.T./M PERIPHERY |
| MAGNETIC COUPLING TO PRIMARY OR TERTIARY WDG | k = 0.96 PER UNIT AS COEFFICIENT |
| WINDING TYPE | LAP-WOUND DOUBLE-LAYER COPPER COILS |
| WINDING LAYOUT | 3-PHASE DELTA, TWO PARALLEL GROUPS/PHASE |
| CONNECTION | DELTA TO 3 SLIP RINGS |
| COILS IN SERIES PER PHASE & GROUP | 15 |
| VOLTS PER COIL | 100 V RMS |

| TERTIARY WINDING FOR ENERGY STORAGE ELEMENTS | 12 POLES AND 6 GROUPS |
|---|---|
| TOTAL POWER RATING | 2880 KVA/2760 KW |
| ENERGY STORAGE ELEMENTS | 100 CELLS IN SERIES AT 2.0 V EACH |
| POWER RATING PER GROUP | 460 KW/480 KVA |
| VOLTAGE/GROUP ON ENERGY CELLS OR ESE ASSEMBLY | 200 VDC AT MAXIMUM CHARGE LEVEL |
| CURRENT/GROUP ON CELLS OR ESE ASSEMBLY | 2300 ADC AT MAXIMUM CHARGE RATE |
| TERTIARY SLOTS & COILS | 72/72 |
| COILS/GROUP | 12 |
| WINDING LAYOUT | 2 COILS IN SERIES AND 2 GROUPS IN PARALLEL TO WYE |
| WINDING TYPE | DOUBLE LAYER, DIAMOND-SHAPED COPPER COILS |
| SLOTS PER POLE AND PHASE | q = 2 |
| VOLTAGE/GROUP ON TERTIARY WINDING | 150 V RMS LINE TO LINE |
| CURRENT/GROUP OF EACH TERTIARY WINDING | 1847 A RMS |
| AC/DC INVERTER OUTPUT RATING | 480 KVA/GROUP |
| VOLTAGE ISOLATION BETWEEN GROUPS OR TO PRIMARY | 5000 V RMS |
| TEMPERATURE RISE WINDING | 160 DEGREES C |
| ENERGY STORAGE CAPACITY IN 6 GROUPS | 100 MJ |
| VOLTS PER COIL | 43.3 VOLTS RMS |

804

ENERGY STORAGE POWER SOURCE USING A WOUND-ROTOR INDUCTION MACHINE (WRIM) TO CHARGE AND DISCHARGE ENERGY STORAGE ELEMENTS (ESEs)

BACKGROUND OF THE INVENTION

Field of the Invention

This invention relates to energy storage power sources that receive and store power from an external source and deliver the energy to a load, and more particularly to the use of a wound-rotor induction machine (WRIM) to receive energy from an external source, store the energy in N energy storage elements (ESEs), and discharge the ESEs to deliver energy to a load producing output. The WRIM provides a safe, reliable and efficient system to provide high-level AC and DC output voltages.

Description of the Related Art

Energy storage power sources receive and store energy from an external power source, AC or DC, and when needed deliver the power to a load. These types of energy storage power sources store energy in a number of individual storage cells such as batteries, high-density capacitors or fuel cells. With current technology, each of these cells is limited to produce approximately 2-3 Volts DC. To deliver a high DC output voltage e.g., 1,000 Volts to the load may require connecting 500 storage cells in series across the load. The practical drawbacks include size, weight, reliability and decrease in efficiency as individual cells age, and safety considerations.

As shown in FIG. 1, an energy storage power source 10 includes an AC power source 12 such as may be provided by a utility's power grid that provide an AC input voltage via an AC main bus 14. To support the charging of N storage cells 16, A like plurality of step-down transformers 18 and AC/DC rectifiers 20 step the AC input voltage down and convert it to a usable voltage e.g. 2-3 V DC, to charge each of the N storage cells 16. The storage cells 16 are interconnected via contactors 22 that when CLOSED provide a series connection of all of the storage cells 16 to sum their individual voltages to provide a higher DC output voltage 24 across a load 26.

A voltage equalizing network (VEN) 28 is connected across each of the storage cells 16. Each VEN 28 includes a first switch Q1 in series with a resistor R1 to help balance differences in storage cell terminal voltages among the group of N storage cells. Each VEN 28 also includes a second switch Q2 in parallel with Q2/R1 that acts as a bypass should a particular storage cell 16 fail.

Because of size, weight, reliability, loss of efficiency and safe considerations this approach becomes impractical when the number of storage cells is larger e.g, sufficient to provide a DC output voltage of 1,000 V.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides a stored energy power source that uses a wound-rotor induction machine (WRIM) to receive energy from an external source, store the energy in N energy storage elements (ESEs), and discharge the ESEs to deliver energy to a load producing output. The WRIM provides a safe, reliable and efficient system to provide high-level AC and DC output voltages.

In an embodiment, the WRIM includes N tertiary windings each wound 360/N degrees and distributed around a first magnetic core and a secondary (e.g., rotor) winding that is wound 360 degrees around a second magnetic core configured to rotate relative to the first magnetic core and coupled to a load producing output. N bi-directional AC/DC converters couple each of the tertiary windings to a respective energy storage element (ESE). Each ESE includes one or more series-connected storage cells such as a battery, high-density capacitor or fuel cell. In a charging state, a WRIM controller couples an external energy source to the WRIM to create a traveling magnetic field to provide the relative rotation between the first and second magnetic cores (e.g., stationary stator magnet and rotating rotor magnet) and to magnetize the tertiary windings to provide power through the AC/DC converters to selectively charge the N ESEs. In a discharge state, the WRI controller discharges at least some of the N energy storage elements back through the AC/DC converters to excite the tertiary windings to create a traveling magnetic field to magnetize an airgap to assist the relative rotation between the first and second magnetic cores and to individually contribute to a total flux to magnetize the secondary winding to induce an AC output voltage on the secondary winding proportional to the sum of the voltages from the discharging energy storage elements and deliver the energy to the load producing output. The AC output voltage may be rectified to provide a DC output voltage.

In an embodiment, the external energy source is coupled to the WRIM by energizing a primary (e.g., stator) winding that is wound 360 degrees around the first magnetic core with a variable AC input voltage at a variable frequency f2. In an embodiment, the external source is an AC power source that supplies an AC voltage at a fixed frequency f1. An AC/AC converter converts that AC voltage to the variable AC input voltage at the variable frequency f2. In another embodiment, the external source is a DC power source that supplies a DC voltage. A DC/AC converter converts the DC voltage to the variable AC input voltage the variable frequency f2. Other types of external energy sources and methods of coupling the energy into the WRIM are contemplated and understood to be within the scope of the invention.

In an embodiment, the AC output voltage is scaled by a transformer ratio defined by the number of turns on the secondary winging to the number of turns on each of the tertiary windings. A step-up transformer ratio is greater than 1:1 and serves to increase the output voltage. For example, assuming a number turns ratio of 5:1 and four ESEs that each provide 50 V DC. A simultaneous discharge of all 4 ESEs can provide an AC output voltage of 1,000 V AC (50*4*5). The step-up transformer ratio can support much higher output voltages with far fewer storage cells. Alternately, the turns ratios may designed to provide a step-down transformer ratio (less than 1:1) to accommodate low voltage loads.

In an embodiment, the WRIM optionally includes a flywheel coupled to the second magnetic core (e.g., rotor).

Each of the external power source, ESEs, flywheel and the load are suitably configured for bi-directional transfer of energy. Energy may flow from the external power source to charge the ESEs or flywheel or directly to the load. Energy from the ESEs may flow to the load or possibly the flywheel. Energy from the flywheel may flow back to charge the ESEs or to the load. Finally, if unused, energy stored in the load may be transferred back to the ESEs, the flywheel and finally the external power source.

In an embodiment, each of the primary (e.g., stator), secondary (e.g., rotor) and N tertiary windings are electrically isolated from each other and the N ESEs are electrically isolated from each other.

In an embodiment, given a single primary (e.g., stator) winding and N tertiary windings that share the same slots in the WRIM, the AC input voltage must be decoupled when discharging any of the cells. As a result, the N bi-directional AC/DC converters are independently controllable to selectively charge one or more ESEs exclusively or (XOR) independently controllable to selectively discharge the one or more ESEs. A single primary cannot simultaneously charge and discharge different ESEs.

In an embodiment, the primary (e.g., stator) winding is segmented into M primary windings each of which independently receives a variable AC input voltage from the external source via an AC/AC or DC/AC converter. Each primary winding is magnetically coupled to one or more tertiary windings. The WRIM controller can simultaneously charge one or more ESEs coupled to a first subset of the M primary windings and discharge one or more ESEs coupled to a second subset of the M primary windings in which the first and second subsets do not overlap. For example, given 6 primary windings that are each coupled to 2 tertiary windings (total of 12 tertiary windings), the WRIM controller might simultaneously charge the ESEs coupled to the $1^{st}$ six tertiary windings while discharging the ESEs coupled to the $2^{nd}$ six tertiary windings.

In an embodiment, as the ESEs are discharged their terminal voltages may droop causing the AC output voltage to fall below a target voltage. Or the AC output voltage may for other reasons exceed the target voltage. A load power factor controller can be coupled to the load producing output to modulate an inductive-resistive load to actively adjust a power factor of the WRIM to vary a rotational speed of the second magnetic core to maintain the AC output voltage within a specified tolerance of a target voltage. For example, an increase in slip (decrease in rotor speed) increases the induced AC output voltage to account for a drop in ESE voltage.

In an embodiment, a flywheel is coupled to the second magnetic core (e.g., rotor) to store energy when the flywheel is accelerated and to deliver energy back to the WRIM when the flywheel is decelerated. In an embodiment, the WRIM controller discharges both the ESEs and flywheel to deliver energy to the load. The ESEs deliver energy quickly with a much shorter time constant than the flywheel. Typically, the flywheel starts to deliver energy once the ESEs are partially depleted. The flywheel may be directly coupled to the shaft of the WRIM or have an intermediate gearbox providing a speed change between the WRIM and the flywheel.

In different embodiments, the WRIM controller decouples the external power source from the WRIM, using only energy stored in the ESEs and flywheel (if provided) to deliver energy to the load or leaves the external power source coupled to the WRIM to deliver additional energy to the load.

These and other features and advantages of the invention will be apparent to those skilled in the art from the following detailed description of preferred embodiments, taken together with the accompanying drawings, in which.

BRIEF DESCRIPTION OF THE DRAWINGS

FIGS. 8A-8C are tables specifying design parameters for the WRIM shown in FIGS. 7A-7D.

DETAILED DESCRIPTION OF THE INVENTION

The present invention provides a stored energy power source that uses a wound-rotor induction machine (WRIM) to receive energy from an external source, store the energy in N energy storage elements (ESEs), and discharge the ESEs to deliver energy to a load producing output. Energy storage and delivery can be supplemented with a flywheel attached to the rotor. The WRLM provides a safe, reliable and efficient system to provide high-level AC and DC output voltages.

As used herein, generally speaking the WRIM includes a primary winding that is wound 360 degrees around a first magnetic core and coupled to a machine energy input to receive a variable AC input voltage at a variable frequency (electric power), a secondary winding that is wound 360 degrees around a second magnetic core configured to rotate relative to the first magnetic core and coupled to a load producing output and N tertiary windings each wound 360/N degrees and distributed around the first magnetic core and magnetically coupled to both the primary and secondary windings. In general, the primary (stator) winding and tertiary windings may be wound on either magnetic core and the secondary (rotor) winding wound on the other core which rotates relative to each other. More conventionally, the stator winding is wound on a stationary magnetic core and rotor winding is wound on an inner magnetic core that rotates inside the stationary magnetic core. Without loss of generality, the embodiments of the invention will be described using the conventional nomenclature of stator and rotor windings in which additional tertiary windings are distributed around the stationary magnetic core. Furthermore, the windings may be single or polyphase. Without loss of generality, the invention will be described using conventional 3-phase windings.

Figure 1:
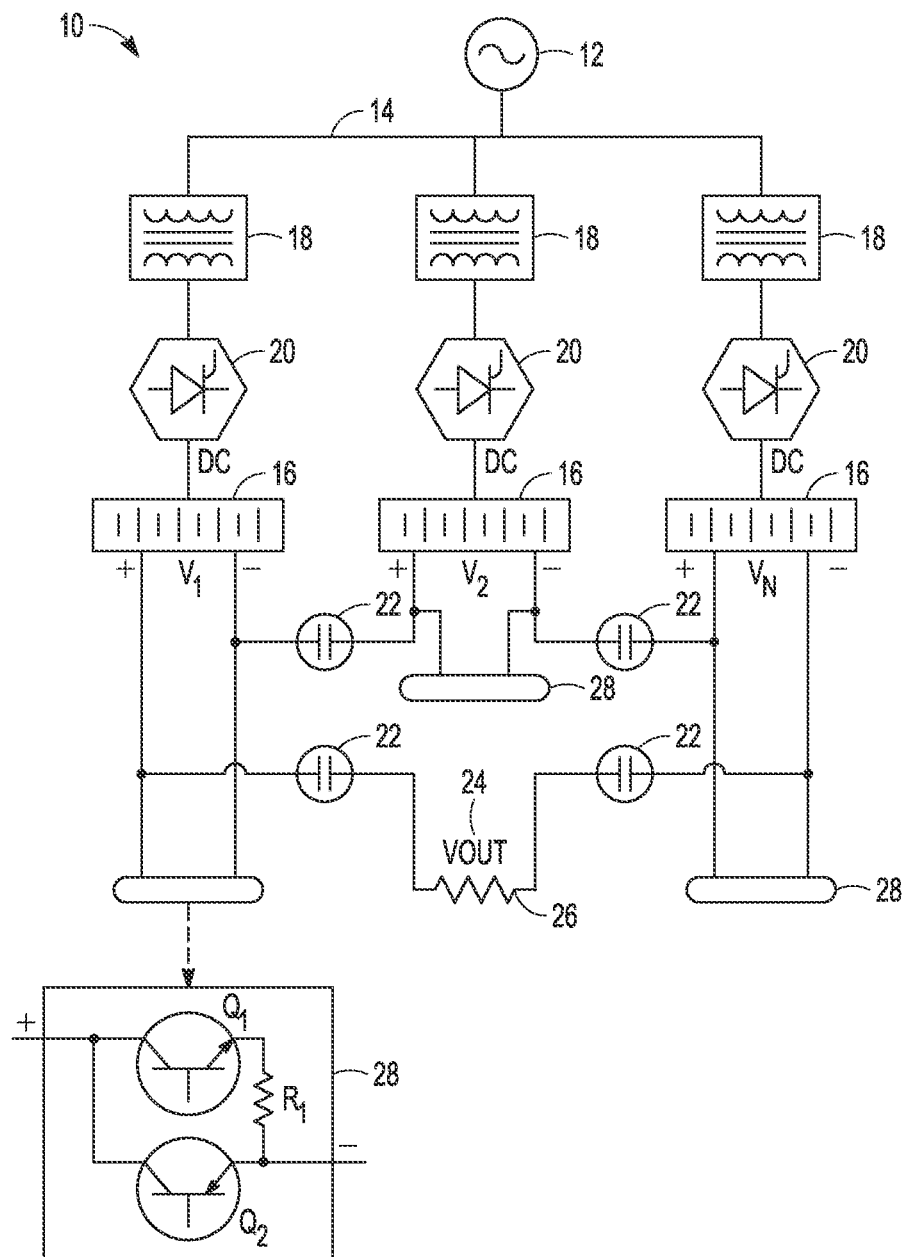
FIG. 1, as described above, is a block diagram of a known energy storage power source in which step-down transformers are configured to charge individual storage cells, which are connected in series to sum their voltages and deliver energy to a load.
Figure 2:
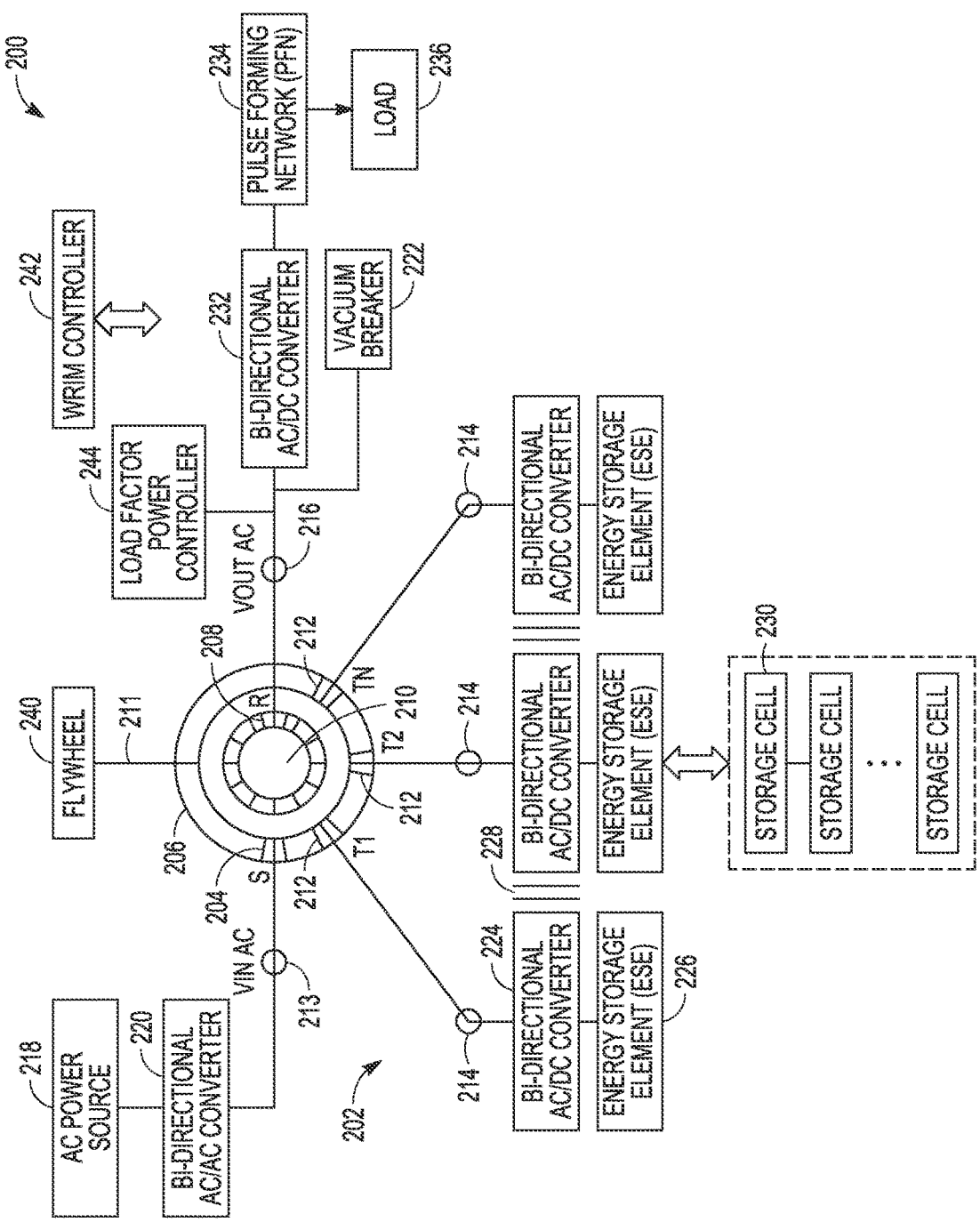
FIG. 2 is a block diagram of an energy storage power system that uses a WRIM to transfer energy to and from individual ESEs to deliver energy to a load.

Referring now to FIG. 2, an embodiment of an energy storage power source 200 includes a WRIM 202 having a stator winding S 204 that is wound 360 degrees around a stationary magnetic core 206, a rotor winding R 208 that is wound 360 degrees around a rotating magnetic core ("rotor") 210 configured to rotate inside the stationary magnetic core 206 and N tertiary windings T1, T2 . . . TN 212 each wound 360/N degrees and distributed around the stationary magnetic core 206 and magnetically coupled to both the primary and secondary windings. Stator winding 204 is shown as a single polyphase evenly distributed winding, which is common. As will be described, the stator winding may be segmented into M segments each magnetically coupled to one or more tertiary windings. The stator, rotor and tertiary windings have respective turns ratios Ns, Nr and Nt(i) for i=1 to N. The stator-to-tertiary ratios Ns/Nt(i) will determine the magnitude of the AC voltages on each of the tertiary windings. The rotor-to-tertiary ratios Nr/Nt(i) will determine the transformation ratios (step-up or step-down) from the tertiary windings to the rotor winding. A machine energy input 213 is coupled to the stator winding 204, energy storage ports 214 are coupled to the respective tertiary windings 212 and a load producing output 216 is coupled to the rotor.

An external power source supplies power to store energy in WRIM 202. In this particular embodiment, the external power source is configured to provide a variable AC input voltage Vin at a variable frequency f2 to energize stator winding S 204. As shown, the external power source is an AC power source 218 such as a common utility power grid that supplies an AC voltage at a fixed frequency f1. A bi-directional AC/AC converter 220 converts the AC voltage at fixed frequency f1 to the variable AC input voltage Vin at the variable frequency f2 that is supplied to input 213 to energize the stator winding and deliver power to the WRIM. The preferred control mode is for voltage to be applied to the stator winding in constant ratio of Volts/Hertz. Alternately, the external power source could be a DC power source that supplies a DC voltage. A bi-directional DC/AC converter would convert the DC voltage to the AC input voltage Vin at variable frequency f2. Other types of external energy sources and methods of coupling the energy into the WRIM are contemplated and understood to be within the scope of the invention.

To start the WRIM and bring rotor 210 up to speed, a vacuum breaker 222 is closed (shorted) to short rotor winding 208. The ESE AC/DC converters are de-energized to open the tertiary windings 212. Line DC is brought in through one of the ESE AC/DC converters and changed to variable frequency AC to provide power to start the WRIM. Once rotor 210 is up to a baseline shaft speed (e.g., 3600 rpm), vacuum breaker 222 is opened such that the rotor has capacitor shunt-excitation in place to magnetize the tertiary windings 212.

Energizing the stator winding S 204 creates a traveling magnetic wave that rotates rotor 210 inside stationary magnetic core 206 and magnetizes the N tertiary windings 212 producing AC voltages Vp(i)=Vin/(Np/Nt(i)) at each of the N energy storage ports 214. Each port is connected to a bi-directional AC/DC converter 224, which is connected to an Energy Storage Element (ESE) 226. The ESEs are preferably electrically isolated 228 from each other. Each ESE 226 includes one or more series-connected storage cells 230, e.g. batteries, high-density capacitor or fuel cells. With current technology, each cell can produce approximately 2-3 V DC when fully charged. The ESEs may or may not be identical, and may or may not produce the same total DC voltage. Consequently, the primary-to-tertiary turns ratios may be designed to provide different DC voltages to charge the different ESEs. When discharged, each ESE produces through its respective converter 224 an AC voltage that excites the corresponding tertiary winding 212 at the energy storage port 214 to create a traveling magnetic field to magnetize a radial airgap between the rotor and stationary magnetic core to assist the rotation of the rotor and to produce a magnetic flux that contributes (sums) to a total magnetic flux that is magnetically coupled to rotor winding 208. The AC voltage at the energy storage port, hence the contribution to the main magnetic flux is scaled by the transformation ratio Nr/Nt(i). If that ratio is greater than one, it acts as a step-up transformer to increase the tertiary voltage level. If the ratio is less than one, it acts as a step-down transformer to decrease the tertiary voltage level. When each ESE is selectively energized through its converter the machine's magnetic flux is increased in controllable steps up to magnetic saturation limit. One or more ESEs can be selectively charged or discharged simultaneously or serially.

The traveling magnetic field and corresponding total magnetic flux induce an AC output voltage VoutAC on the rotor winding 208 proportional to the sum of the voltages from the discharging ESEs 226 weighted by their respective rotor-to-tertiary winding ratios and deliver the combined energy to the load producing output 216. If desired, a bi-directional AC/DC converter 232 converts the tertiary winding AC output voltage to a DC output voltage VoutDC. The output voltage, VoutAC or VoutDC, is used to charge a pulse forming network (PFN) 234 or is delivered directly to a load 236 without the PFN. The PFN 234 can store, at least temporarily, the energy supplied by the WRIM before it is released to load 236.

As an example, with WRIM spinning at or near full speed, the each of the ESEs 226 are charged to their full rated voltage, which is a low voltage e.g. 48 volts DC representing 24 battery cells of 2.0 volts each in series. Energy for charging is derived from AC power source 218, which may be at a medium voltage such as 480 Volts AC 3-phase. The objective of energy storage power source 200 is to produce a higher voltage on final output at for example 1,000 V DC, which corresponds on the machine windings to a minimum of 750 Volts AC 3-phase. In charging mode, the stator winding has an input voltage which is moderately high and the tertiary windings are wound for fewer turns and thus allow cell charging to occur at a low voltage such as 48 V DC, which requires an AC voltage for each ESE AC/DC converter 224 of about 38 Volts line to line 3-phase. If the WRIM is wound for 480 Volts AC on the stator, the example voltage turns ratio is 480:38 or 12.6:1. For an actual machine winding requiring integral number, the winding turns ratio should be 12:1. If three (3) ESEs are configured by example and each corresponding AC/DC converter can attain a 38 VAC nominal terminal voltage and 750 V AC final output is required, the rotor-to-tertiary voltage ratio is 750:(3×38) or 6.58:1 (ignoring machine slip for now). In practice, the WRIM would have the next higher up integral number for a winding turns ratio, thus there must be a rotor-to-tertiary winding turns ratio of 7:1. It is important to note that a 1,000 V DC output is produced with only 72 battery cells whereas a series-connected source would require 375 battery cells.

A flywheel 240 may be optionally mechanically coupled to rotor 210 via shaft 211 to both store and delivery kinetic energy. As is well known, energy is stored in the flywheel by increasing the rotor speed and is discharged from the flywheel by reducing the rotor speed. Rotor speed is proportional to the frequency applied to the rotor winding, increasing the frequency increases speed and decreasing the frequency reduces speed. Flywheel 240 is typically charged by the AC power source but may be charged by excess energy in either the load or the ESEs. Flywheel 240 delivers energy with a longer time constant than the discharge time constant of the ESEs 226. For example, in an embodiment one or more of the ESEs 226 are discharged to deliver a burst of energy to the load. When the ESEs 226 are partially discharged the flywheel 240 is used to deliver energy on a much longer time constant through rotor 210 to the load. This combined discharge characteristic is beneficial to the load in many instances.

A WRIM controller 242 generates control signals to OPEN/CLOSE (OFF/ON) AC/AC Converter 220, ESE AC/DC converters 224, output AC/DC converter 232 and to increase or decrease rotor frequency f3 to charge or discharge flywheel 240. As will be described in conjunction with FIG. 3, in a fully bi-directional system there are many different "modes" in which to supply, store and delivery energy.

With a WRIM, the stator and tertiary windings are always at the same frequency f1 independent of rotor speed. The rotor output winding frequency f3 is a variable dependent on shaft speed OmegaR. The frequency of the rotor circuit is f3=s*f1 where f1 is the primary winding supply frequency (Hz) and s is the per unit slip defined as s=(OmegaS−OmegaR)/OmegaS where OmegaS is synchronous shaft speed defined as 2*Pi*f1/pole–pairs and OmegaR is actual shaft speed, both in radians/sec.

If WRIM 200 is operating close to its synchronous (full) speed, the output frequency of the rotor f3 will be a low frequency. For example if slip=0.10 per unit, and f1 is 400 Hz, the rotor frequency will be 40 Hz. This is acceptable since the output objective is to rectify this rotor frequency and produce a high voltage DC output, the actual frequency is not of great importance. Conversely, if the WRIM shaft speed is at one-half speed point and slip=0.50 per unit, the higher output frequency of 200 Hz is also acceptable to rectify to DC.

Consider the case where the ESEs are fully charged and ready for discharge. The stator winding is disconnected (i.e. the AC-AC frequency converter 220 is OFF) from the AC power source. Tertiary winding power from the summation of the ESEs once converted to AC provides the magnetic excitation to the WRIM airgap radially-directed magnetic flux. At standstill, the induced rotor flux due to action of the combined tertiary windings is at its maximum value. At full synchronous speed, the induced rotor flux is approximately zero. At a practical operating slip such as 10%, the induced rotor flux is 10% of its standstill value.

In a WRIM, the full power of the combined ESEs passes through the induction machine, which is defined as the slip power and there will always be a nominal slip value, e.g. 10%. The machine efficiency as an energy converter is typically 92-95% so the output power on the rotor will be 0.92 to 0.95 per unit of full power. However, the most important aspect is the voltage step-up transformation. If as indicated earlier the desired overall rotor: tertiary voltage transformation ratio is 7:1 and operating slip is 10%, then the actual winding turns ratio should be 10×7 or 70:1. The effective turns ratio is Nr/(Nt(i)*slip). This is a practical number to implement. For example, tertiary windings can have 12 turns/phase, the ESEs each have 36 turns/phase collectively and rotor would be wound with 2520 turns/phase. In a 12-pole machine, this amounts to 210 turns/phase/pole. A rotor may typically have 3 slots/pole/phase therefore the turns per slot per phase is 70 turns.

Another practical issue is that as the stored energy in each ESE is depleted by its discharge its terminal voltage will also decrease. It is desirable to maintain the VoutAC or VoutDC at the load producing output within a specified tolerance of a target value. One known approach is to control the AC/DC converters 224 to vary the input to output voltage ratio. The converters are built with an active front end, which can boost or maintain constant their AC output voltage by their switching device gating action when in the inversion mode to compensate for a continuous decrease in the DC input voltage from the discharging ESEs. A new approach (shown in more detail in FIG. 4D) uses a load factor power controller 244 (which itself is known for performing compensating a capacitive load to bring the power factor back to unity) to (a) degrade a power factor of a secondary load circuit from being a purely resistive load (unity power factor) or (b) to a resistive load shunted by an auxiliary and controllable inductive branch. This effectively modifies the slip, which in turn modifies the transform ratio to hold Vout at the target value.

Figure 3:
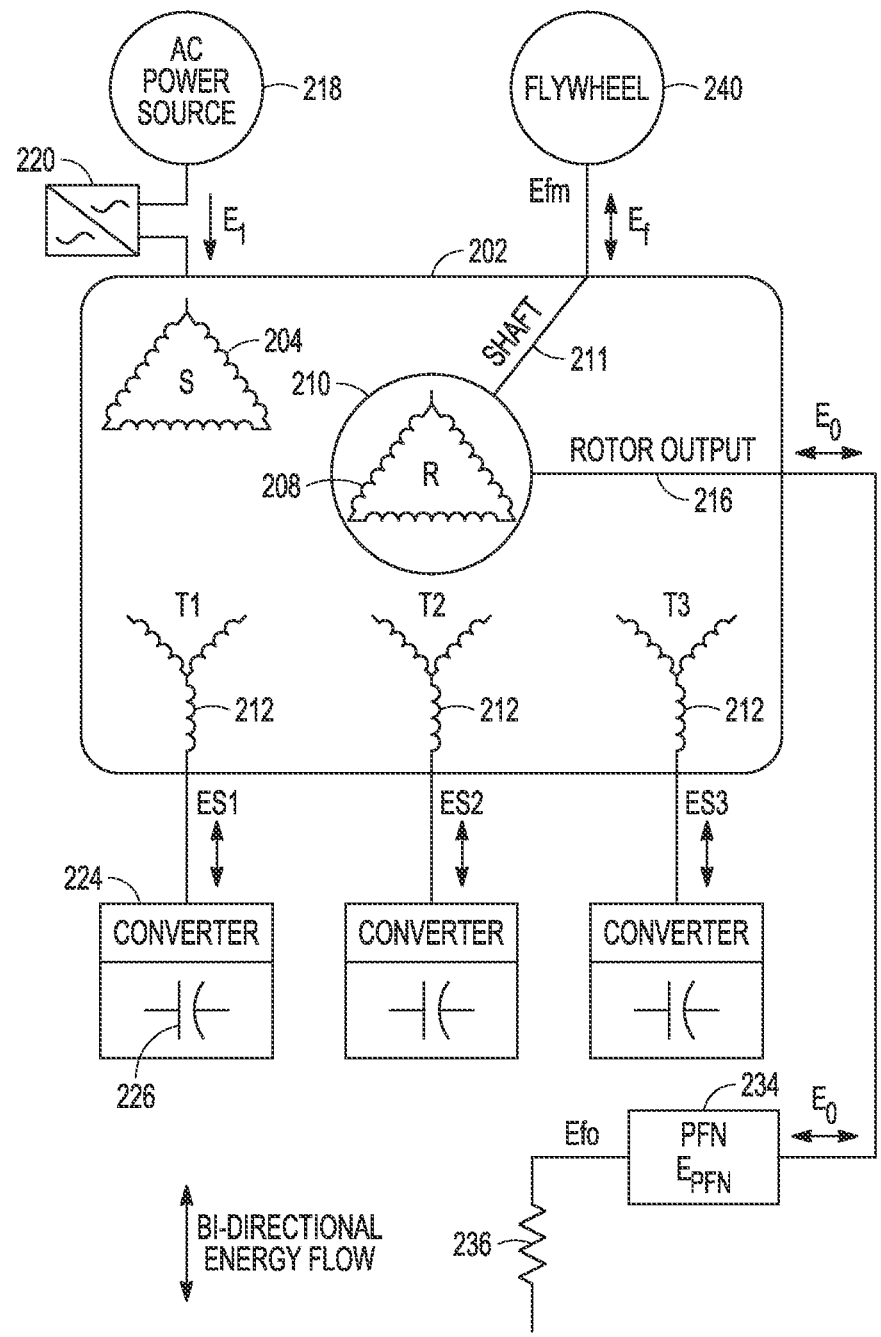
FIG. 3 is a diagram of illustrating the bi-direction flow of energy between an external power source, the ESEs, a flywheel and the load.

As shown in FIG. 3, the depiction of the energy storage power source 200 has been simplified to illustrate the different bi-directional energy flows through the system and different "modes" of operation. The rotor winding output AC/DC converter, the load factor power controller and shorting breakers are omitted for simplicity. Each of the windings is depicted as 3-phase. For clarity, like reference numbers will be maintained with FIG. 2.

It is understood that there are possibly 4 different types of energy storage technologies in energy storage power source irrespective of exact number of electrostatic (electrochemical) storage cells/banks (ESEs).
1. Flywheel inertial energy storage.
2. Electrostatic/electro-chemical energy storage at a low voltage level.
3. Capacitive energy storage in the output pulse forming network (PFN) at a high voltage level.
4. Magnetic energy storage in the electrical machine (WRIM) airgap and winding inductances.

The energies are defined as:
E1=AC power source energy.
Ef=flywheel kinetic energy flow into and out of the WRIM rotor as mechanical energy.
EFm=maximum amount of stored kinetic energy in flywheel at prescribed maximum speed.
ES1, ES2, ES3=energy flow into and out of the respective ESE; the AC/DC converter required has zero or minimal energy storage. Note amount of energy can vary among the ESEs.
Eo=intermediate output energy produced by or absorbed by the WRIM rotor winding; in preferred embodiment this is a high or medium voltage output; this energy after AC/DC rectification is used to charge the pulse forming network or power load directly without PFN.

Efo=Final energy output of the Pulse Forming Network (PFN); the PFN stores energy in its capacitor bank and can release energy in one large amount or else partition this energy out in smaller amounts since it contains an output electronic switch such as a thyristor to regulate energy flow into the load resistor.

In the most general configuration, each type of energy source (AC power source, flywheel, ESEs and the load) transfer energy bi-directionally. The WRIM controller can turn the different energy sources ON/OFF via the converters in virtually any combination to transfer and store energy from any source to any source.

Most important aspects of system energy flow are contained in six basic modes.

Mode 0—E1 AC power source energy charges the flywheel first, i.e. E1=Ef+small dissipative losses in WRIM S stator winding and windage loss of WRIM. After a fixed time period, E1 charges the multiple ESEs through ES1, ES2 and ES3 from the AC power source, now E1=ES1+ES2+ES3 plus small losses in the 3 AC/DC converters and tertiary winding losses are compensated by stator winding S.

Mode 1—A portion of the flywheel output of inertial energy Ef combines with the summation of storage device energies ES1, ES2 & ES3 when these are discharged into multiple sets of tertiary windings to provide maximum possible output energy Eo (stored within the WRIM) subsequently rectified from rotor winding R to load producing output and the consequent DC power is routed into Pulse Forming Network capacitor energy bank (PFN) and then to the final load.

Mode 2—AC power source and stator winding S are de-energized due to the AC/AC converter being OFF. Flywheel was previously charged in either Mode 1 or from another mode from previous engagement or mission. Flywheel energy is kept at maximum kinetic level Efm and not released initially; the electrostatic (or electrochemical) sources ES1, ES2 and ES3 at low voltage level are magnetically combined by the rotor winding with optional rectification. These energies ES1, ES2 & ES3 are discharged and produce output Energy Eo and final output Efo, with the ESEs brought down to about half of their potential energy level. Subsequently the flywheel is used to collectively recharge the ESEs according to balance equation Ef=ES1+ES2+ES3 whereby the rotor winding R is used to magnetize the machine airgap and also acts as a voltage/power generating winding to recharge the ESEs at a controlled rate. This mode assumes the flywheel is spinning the entire duration of this mode.

Mode 3—AC power source is ON and stator winding S is energized due to the AC/AC converter being ON. Flywheel was previously charged in either Mode 1 or from another mode from previous engagement or mission. Flywheel energy is kept at maximum kinetic level Efm and not released initially; the ESEs ES1, ES2 and ES3 at low voltage level are magnetically combined by the rotor winding and after rectification these are discharged and produce output Energy Eo and final output Efo, with the ESEs brought down to about half of their potential energy level. Subsequently the AC power source with the AC/AC converter ON and flywheel as spinning are jointly used to recharge the electrostatic sources according to balance equation (E1+Ef)=ES1+ES2+ES3 whereby the stator winding S is used to magnetize the machine airgap and the rotor winding acts as a voltage/power generating winding to recharge the ESEs at a controlled rate based upon the flywheel delivering a portion of its kinetic energy now. The multiple AC/DC converters separately control charging rate to each energy source and avoid over-charging.

Mode 4—The ESEs are sequentially discharged or only one ESE is fully discharged. Let ES1 be fully discharged and ES2 and ES3 are being actively discharged but not yet depleted. By use of independent AC/DC converters which regulate current, voltage and power/energy into the ESEs, the flywheel energy Ef is charging up ES1 and also contributing to main output energy Eo, expressed as:

$Ef=ES1+k1(Eo)$ where $k1$ is a proportional constant for the flywheel contribution to load e.g. 0.30 per unit, and $ES2+ES3=k2(Eo)$ where $k2$ is a proportional constant for two energy sources contribution to the output load e.g. 0.70 per unit and $k1+k2=1.0$ per unit.

Mode 5—By previous discharge action of ES1-ES3, the PFN is charged up to full capacitive energy storage level E-PFN and the final load is not fired nor connected so the control system must return the output energy in PFN to the WRIM and then distribute this recovered energy Eo to either the flywheel or to the ESEs or both. Once again, the rotor winding is acting to magnetize the machine airgap and acts as a generating winding to provide a portion of output energy Eo (as stored in PFN) to one, two or three of the ESEs according to their individual energy level. The AC/DC converter's control system measures the ESE that has the lowest voltage/charge level and gives this source a priority in taking this recovered energy. If the ESEs cannot accept any further portion of Eo and the flywheel is fully charged, i.e. Ef=Efm then this recovered energy Eo must be returned to the AC source power (reverse E1) through a bidirectional AC/AC input converter yet this is generally undesirable or excess energy is dumped.

Mode 6—The majority of all ESEs are fully charged. The AC power source is disconnected and the rotor is initially at standstill. Upon a request to charge the PFN to fire the load, energy is transferred from the ESEs to start-up the WRIM and bring the rotor up to a significant operating speed. Energy from the flywheel or ESEs or both collectively is then used to deliver energy to the PFN and load.

Referring now to FIGS. 4A-4D, an embodiment of a 3-phase energy storage power source 400 includes a WRIM 402 having a 3-phase stator winding S 404 that is wound 360 degrees around a stationary magnetic core 406, a 3-phase rotor winding R 408 that is wound 360 degrees around a rotating magnetic core ("rotor") 410 configured to rotate inside the stationary magnetic core 406 and N 3-phase tertiary windings T1, T2 . . . TN 412 each wound 360/N degrees and distributed around the stationary magnetic core 406 and magnetically coupled to both the primary and secondary windings. The rotor winding typically includes a set of three slip-rings and an electrical brush set to transfer AC current into and out of the rotor.

The 3-phase windings are shown as 'delta' windings but other common configurations such as wye can be used. The stator, rotor and tertiary windings have respective turns ratios Ns, Nr and Nt(i) for i=1 to N. The stator-to-tertiary ratios Ns/Nt(i) will determine the magnitude of the AC voltages on each of the tertiary windings. The rotor-totertiary ratios Nr/Nt(i) will determine the transformation ratios (step-up or step-down) from the tertiary windings to the rotor winding. A 3-phase machine energy input 413 is coupled to the stator winding 404, 3-phase energy storage ports 414 are coupled to the respective 3-phase tertiary windings 412 and a 3-phase load producing output 416 is coupled to the rotor.

A 3-phase AC power source 418 such as a common utility power grid supplies a 3-phase AC voltage at a fixed frequency f1. A bi-directional 3-phase AC/AC converter 420 converts the AC voltage at fixed frequency f1 to a 3-phase variable AC input voltage Vin at a variable frequency f2 that is supplied to the 3-phase machine energy input 413 to energize the stator winding S 404 and deliver power to the WRIM to energize the N 3-phase tertiary windings 412.

Each 3-phase energy storage port 414 is connected to a bi-directional 3-phase AC/DC converter 424, which is connected to an Energy Storage Element (ESE) 426. When the AC/DC converter 424 is controlled to operate in a rectification mode, a DC voltage and power is applied to the ESE 426 to charge the ESE. When the AC/DC converter 424 is controlled to operate in a rectification mode, the ESE 426 discharges producing an AC voltage at the tertiary winding that contributes to a total flux that is magnetically coupled to the rotor winding 404 to produce the 3-phase output voltage VoutAC at the 3-phase load producing output 416.

The output power is directed through a 3-phase bi-directional AC-DC converter 430 to a Pulse Forming Network (PFN) 432. The PFN is shown as a 2-stage PFN (L1, C1, L2, C2) whereby charging of the PFN is controlled by a series connected solid-state switches such as an IGBT or thyristor connected to input side of inductor L1. Output load RL 434 is controlled by closing of switch SW1, which may be solid-state or electromechanical.

The rotor winding R has a set of three line-to-line shorting contactors, vacuum breakers 436 as shown or electronic switches connected to its 3-phase output port which are used for the starting mode from zero speed. The WRIM starts identical to a conventional WRIM with shorted rotor winding and in this mode the windings T1-T2-T3 are open circuit.

A load power factor controller 438 is connected to the 3-phase load producing output 416 at the 3-phase output of the rotor winding. After the WRIM is up to full speed, the controller 438 can add inductance to the otherwise resistive load 434 to degrade WRIM's power factor. This increases the rotor current and also modifies the operating slip and thereby varies the rotational speed of the rotor to maintain the AC output voltage within a tolerance of a target voltage.

Figure 4A:
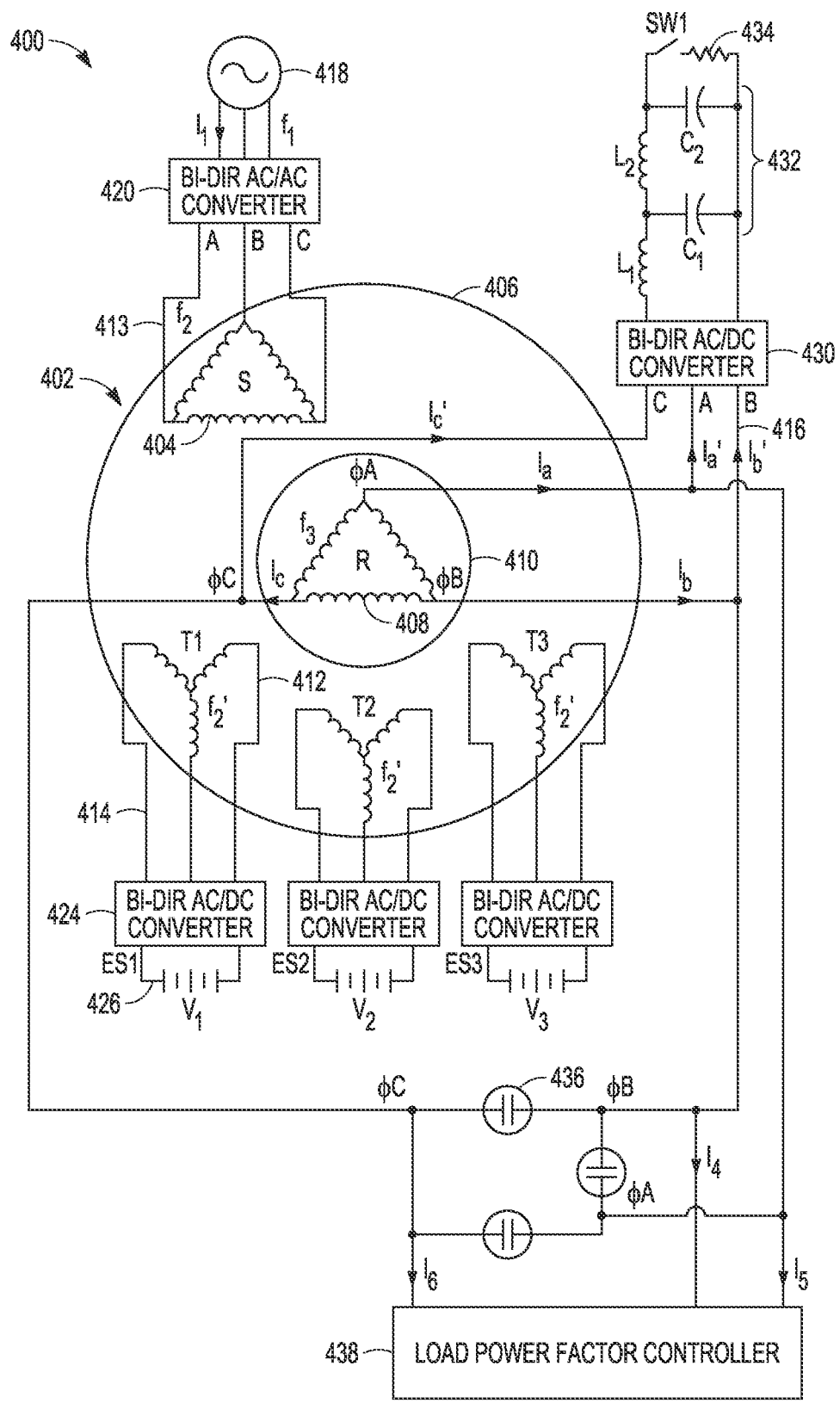
FIGS. 4A-4D are a schematic diagram of a 3-phase energy storage power system, a bi-directional AC/AC converter, a bi-directional AC/DC converter and a load power factor controller used therein.
Figure 4B:
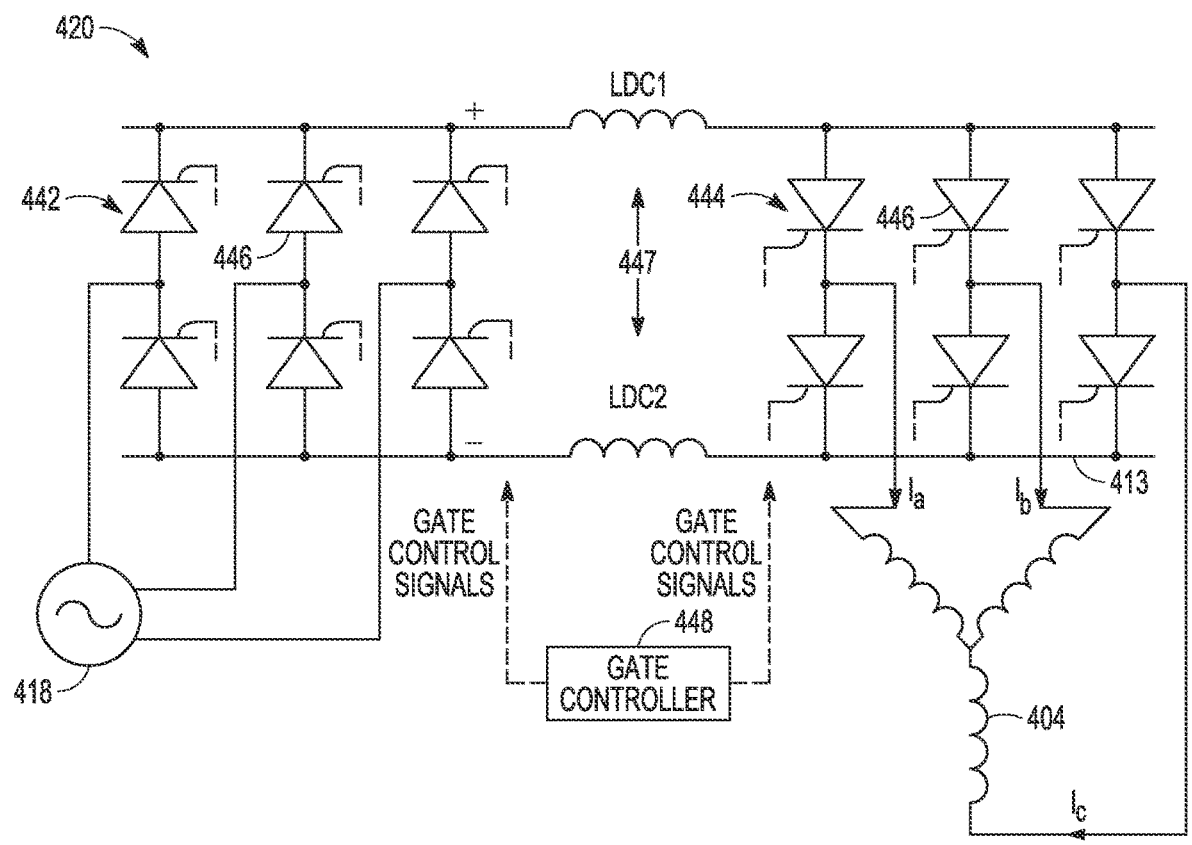

FIG. 4B shows an embodiment of the bi-directional 3-phase AC/AC converter 420 that is common in the industry. The AC/AC converter 420 includes first and second groups 442 and 444 of thyristors 446 (two series-connected thyristors for each phase for a total of twelve) or alternately Insulated-Gate Bipolar Transistors (IGBTs) connected in anti-parallel across a DC link 448. The 3-phase AC power source 418 is connected between thyristors 446 in each pair of the first group 442. The 3-phase machine energy input 413, which is connected to the primary winding on one side, is connected between thyristors 446 in each pair of the second group 444. Gate control is provided to the $3^{rd}$ lead of each thyristor 446 with one or more gate controllers 448. The converter changes the AC voltage at a fixed frequency f1 to a variable AC input voltage at a variable frequency f2. See "A BASIC GUIDE TO POWER ELECTRONICS" Alberty Koss, John Wiley & Sons, Ch 8 Power Balance in Three-Phase Bridge Converters, pages 100-115, 1984.

Figure 4C:
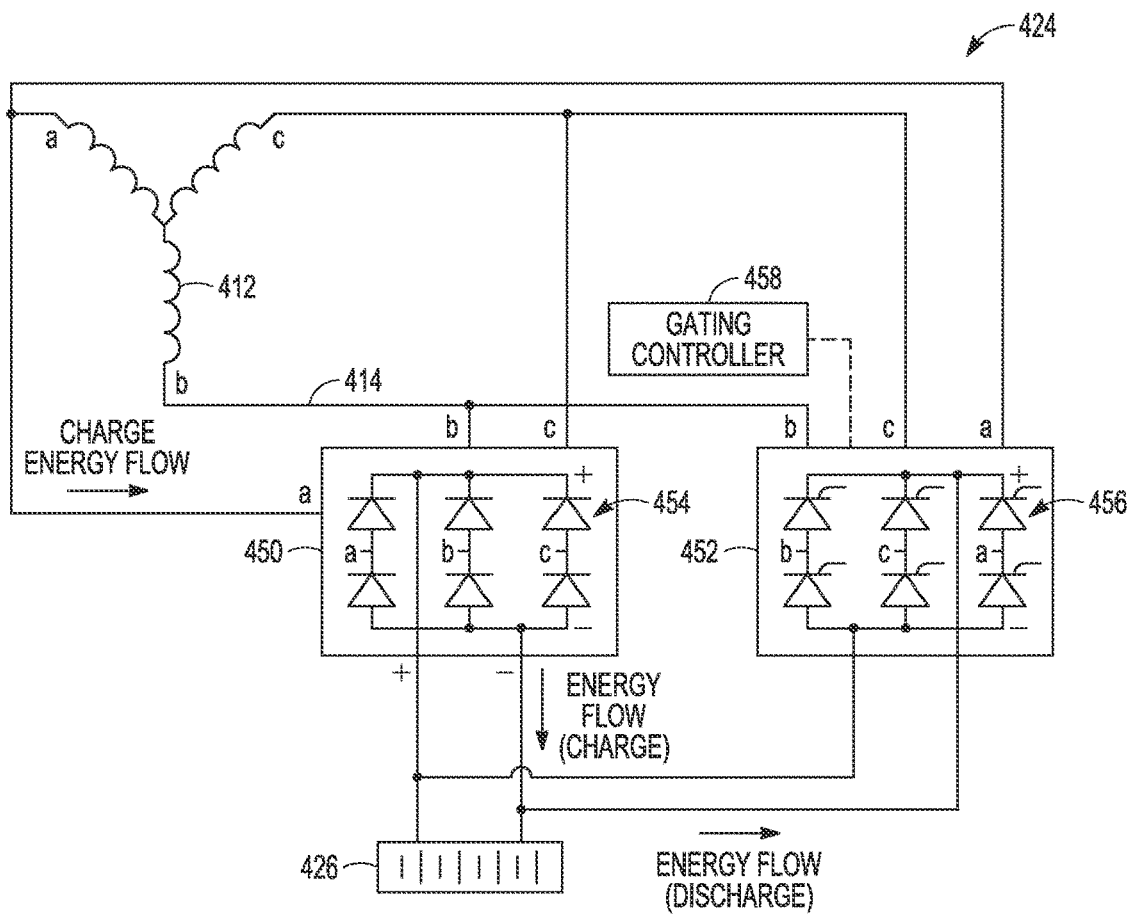

FIG. 4C shows an embodiment of the bi-directional 3-phase AC/DC converter 424 that is common in the industry. The AC/DC converter 424 includes a 3-phase passive diode bridge rectifier 450 and an active thyristor (or IGBT) inverter 452 connected in parallel between a tertiary winding 412 at 3-phase energy storage port 414 and an ESE 426 to alternately charge and discharge the ESE respectively. Rectifier 450 includes three pairs of series connected diodes 454. The 3-phase energy storage port 414 is connected between diodes 454 in the respective pairs. Rectifier 450 converts the 3-phase AC voltage at the energy storage port 414 to a DC voltage that is applied to charge the ESE. Inverter 452 includes three pair of series connected thyristors 456. A gating controller 458 drives the $3^{rd}$ lead of the thyristors 456. The 3-phase energy storage port 414 is connected between diodes 454 in the respective pairs. Inverter 452 converts the ESE's DC voltage to a 3-phase AC voltage at energy storage port 414 to discharge the ESEs and drive the load. See "A BASIC GUIDE TO POWER ELECTRONICS" BY Albert Koss, John Wiley & Sons, Ch 8 Power Balance in Three-Phase Bridge Converters, pages 100-115, 1984.

Figure 4D:
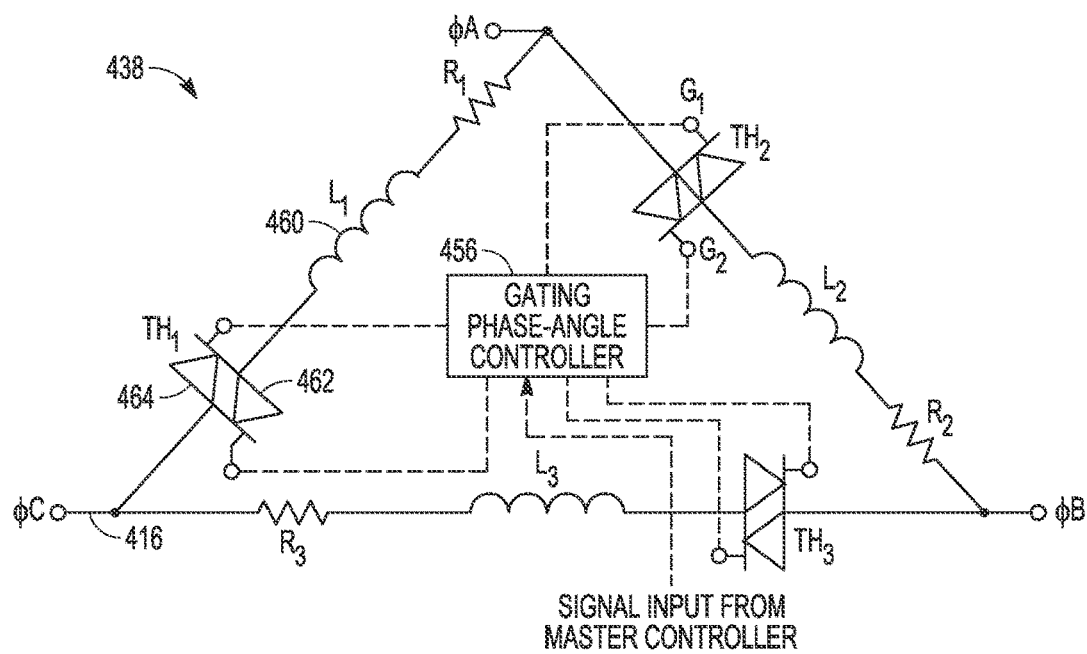

FIG. 4D shows an embodiment of the power controller 438 that is common in the industry. The load factor power controller 438 is connected to the 3-phase load producing output 416 at the output of the rotor. The controller has three legs, each leg including a series connection of an inductor 460 (L1, L2, L3), suitably an air-core AC inductor, a resistor (R1, R2, R3) and a pair of thyristors 462 and 464 connected in anti-parallel to yield bi-directional current flow. A gating phase-angle controller 466 receives a signal input from the WRIM controller and generates control signals to the gate lead of each thyristor. The load factor power controller 438 changes the power factor of the load circuit from being purely resistive to partially inductive, which degrades the power factor from near unity to a lagging value. This increases the rotor current and also modifies the operating slip and thereby varies rotational speed of the rotor to maintain the AC output voltage within a tolerance of a target voltage. The use of a polyphase inductive bank means that there are no appreciable real power losses in this speed-slip control scheme. See "Induction Machines" by Philip L. Alger, Gordon and Breach Science Publishers, CH 8, pages 261-265, 1970.

Figure 5A:
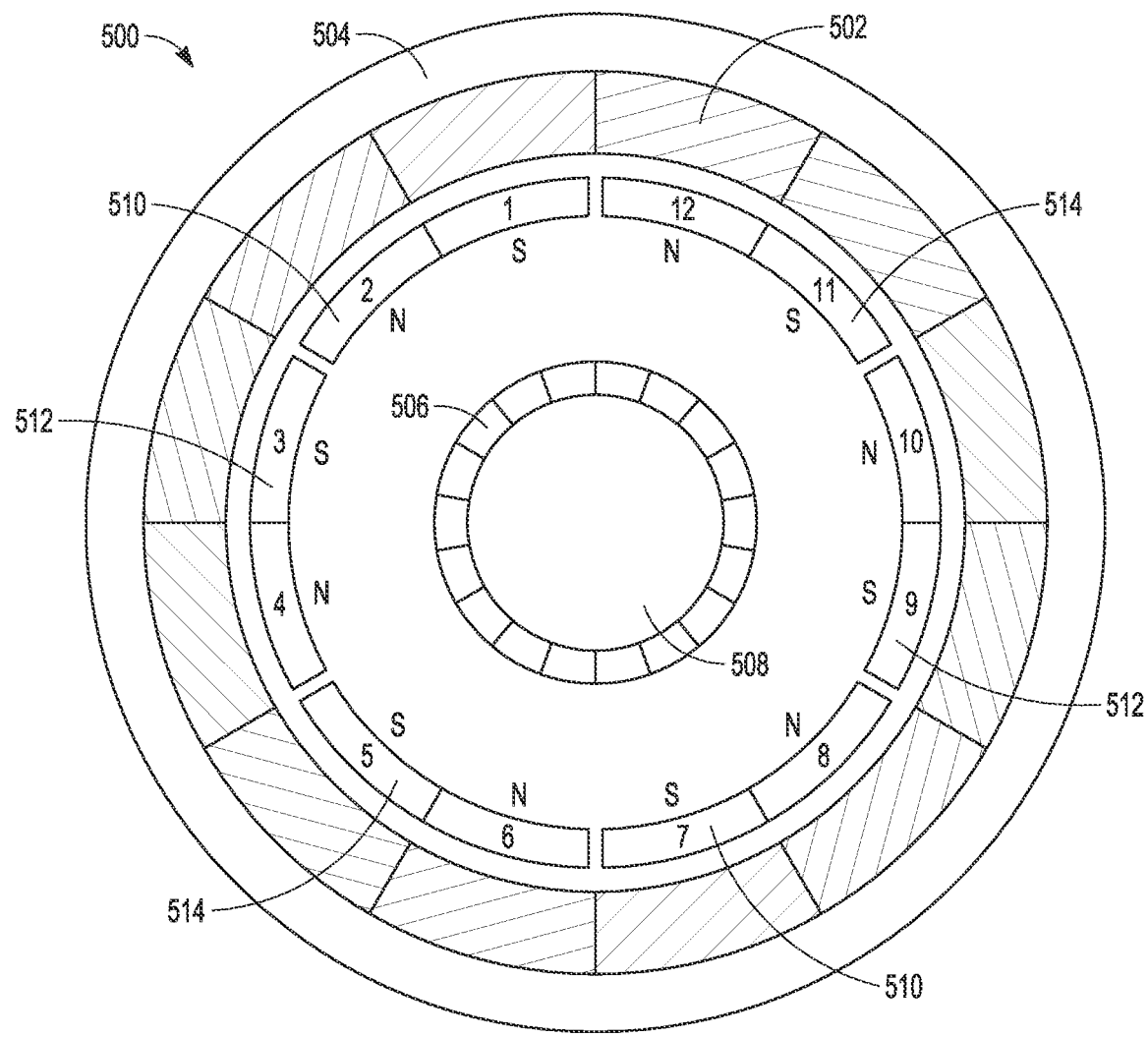
FIGS. 5A and 5B are a diagram of an embodiment of a 12-pole WRIM in which a primary (stator) winding is wound 360 degrees around a stationary magnetic core, a secondary (rotor) winding is wound 360 degrees around a rotating magnetic core and three tertiary windings are each would around respective 120 degrees of the stationary magnetic core to provide three isolated energy ports, and the winding diagrams of the tertiary windings.
Figure 5B:
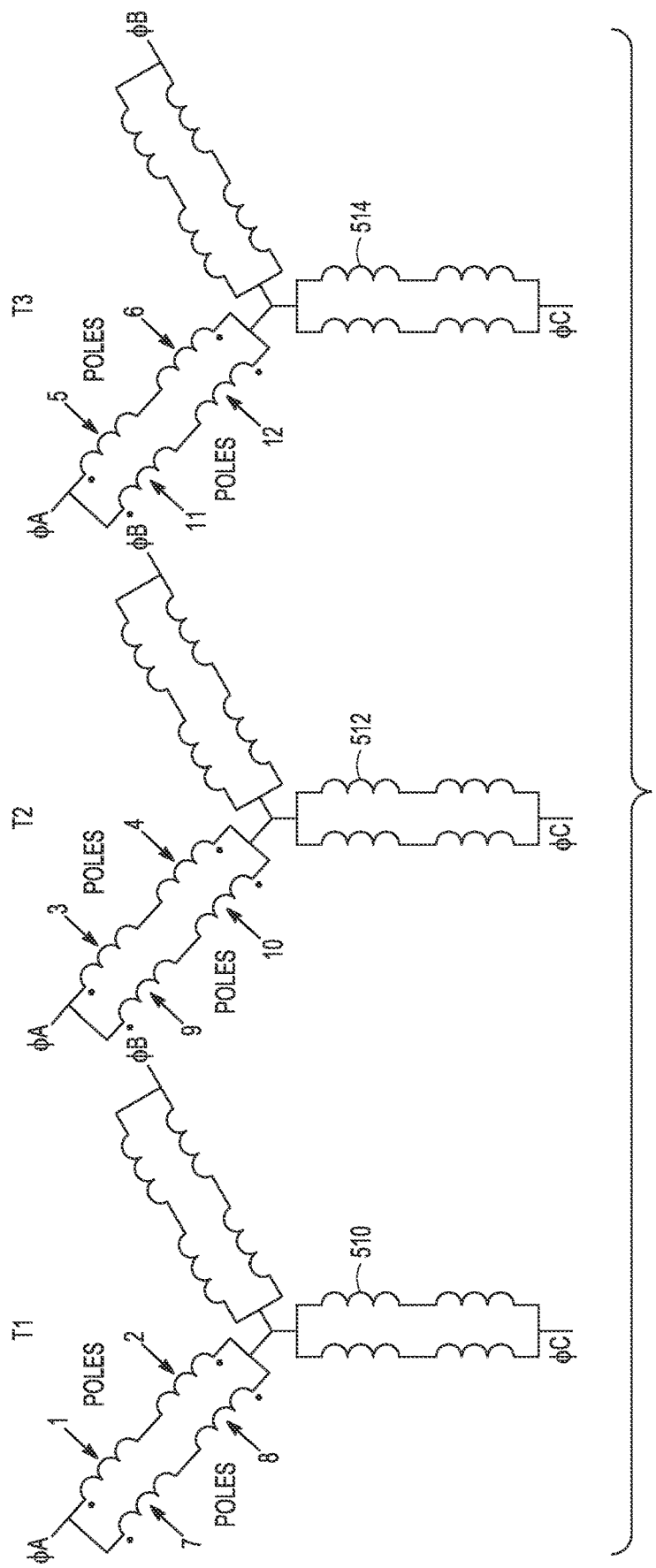

Referring now to FIGS. 5A and 5B, an embodiment of a WRIM 500 configured for use as a energy storage power source is a 12-pole 108 slot/90 slot machine with 3 tertiary winding groups. WRIM 500 includes a primary (stator) winding 502 that is wound 360 degrees around a stationary magnetic core 504. Stator Slots 1-108 contain 12 pole lap-wound fully-distributed double-layer coils in conventional 3-phase winding in delta connection located in the bottom of the slots. This configuration has 3 slots/pole/phase. A secondary winding 506 is wound 360 degrees around a rotor magnetic core 508. Rotor Slots 1-90 contain a delta-connected lap-wound 90-coil fully distributed 3-phase winding; this is a conventional fractional slot winding with 2.5 slots/pole/phase. Turns and voltage per phase are high. Three tertiary windings T1 510, T2 512, and T3 514 are each wound around 2×60 peripheral degrees and distributed around the stationary magnetic core 504. Stator slots 1-18 contain tertiary winding T1, stator slots 19-36 contain tertiary winding T2, and stator slots 37-54 contain tertiary winding T3. The coil layout repeats diametrically opposite for all three windings as 3-phase lap-wound double-layer coils in each and wye connected with galvanic isolation amongst all groups. Each 2-pole group is connected in parallel with diametrical 2-pole group; total of 4 poles forms a 120-degree arc. The primary winding is at bottom of slots and tertiary winding is at top of slots. The 12-pole arrangement of the three tertiary windings is depicted in FIG. 5B.

Figure 6:
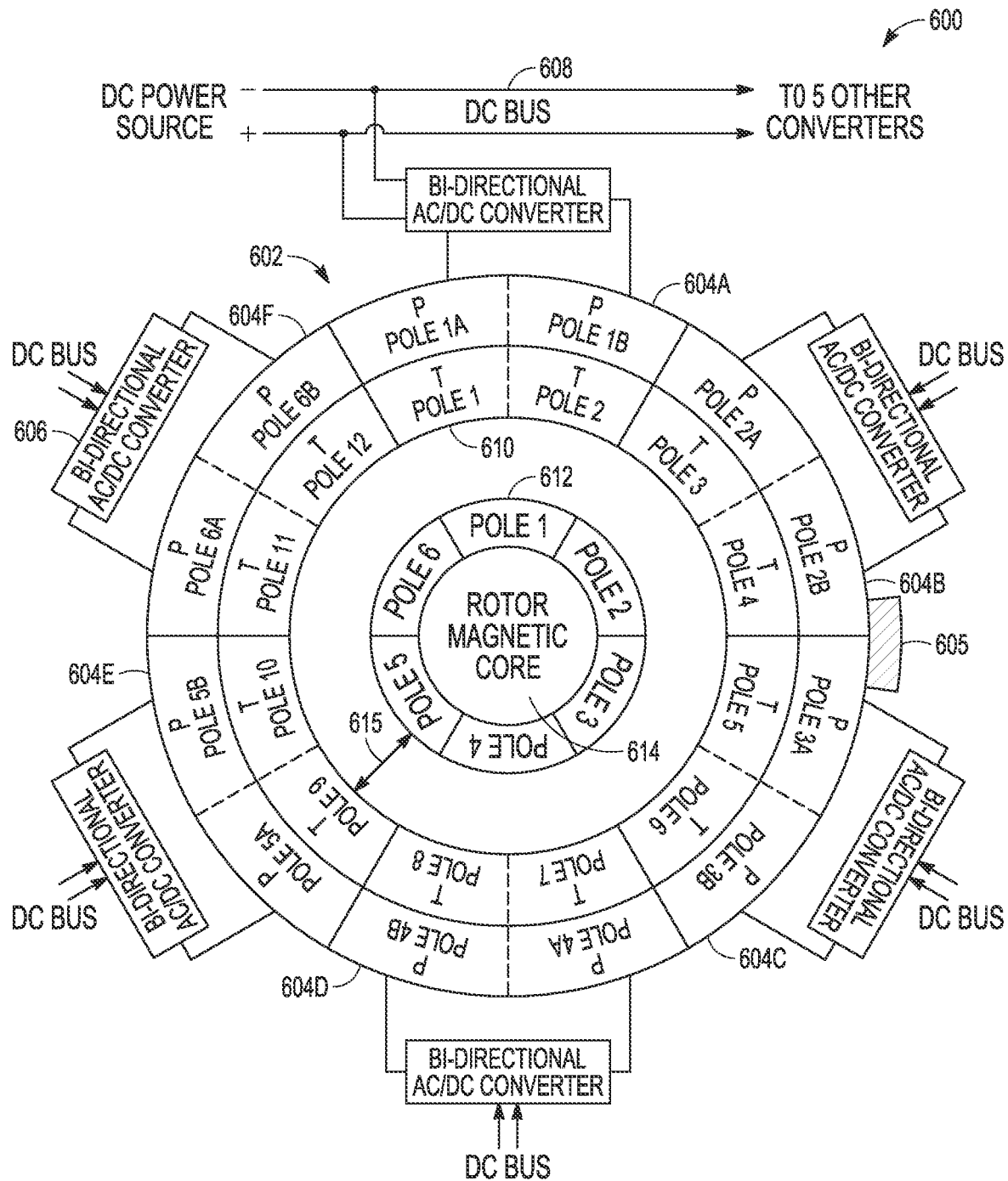
FIG. 6 is a diagram of an embodiment of a WRIM in which a primary (stator) winding is segmented into six segments with each segment magnetically coupled to two tertiary windings to facilitate the simultaneous charging and discharging of ESEs supported by different segments of the primary winding.

Referring now to FIG. 6, an embodiment of an energy storage power source 600 includes a WRIM 602 having a segmented primary winding 604A, 604B, . . . 604F wound around a stationary magnetic core 605 and driven by respective bi-directional 3-phase DC/AC converters 606 to provide additional flexibility to simultaneously charge or discharge different ESEs (not shown) coupled to the WRIM's tertiary windings via bi-directional 3-phase AC/DC converters (not shown). In this example, a DC bus 608 serves as the external power source and provides a DC input voltage. Each of the bi-directional 3-phase DC/AC converters 606 converts the DC voltage into an AC input voltage having a variable frequency that energizes different one of the segmented primary windings 604A, 604B, . . . 604B. In this example, there are 6 segmented primary windings that are each magnetically coupled to 2 tertiary windings for a total of 12 tertiary windings 610. In general, each primary winding segmented can be coupled to an arbitrary number of tertiary windings. At a given time, each pair or group of tertiary windings may be charging or discharging but not both (e.g. XOR operation). However different pairs of tertiary windings may be charging or discharging, they are independent of each other. The stator has 72 slots with the segmented primary winding having 4 slots/pole/phase. Each tertiary winding has 2 slots/pole/phase. A rotor winding 612 is distributed around a rotor magnetic core 614 in 6 poles in a total of 54 slots with 3 slots/pole/phase. A radial airgap 615 separates the rotor magnetic core 614 from stationary magnetic core 605. This configuration allows the energy storage power source to simultaneously charge or recharge certain ESEs while discharging other ESEs to deliver energy to the load.

Referring now to FIGS. 7A-7D and 8A-8C, winding diagrams and design Tables for a 12-pole 72 slot/90 slot WRIM with 6 tertiary winding groups are illustrated.

Figure 7A:
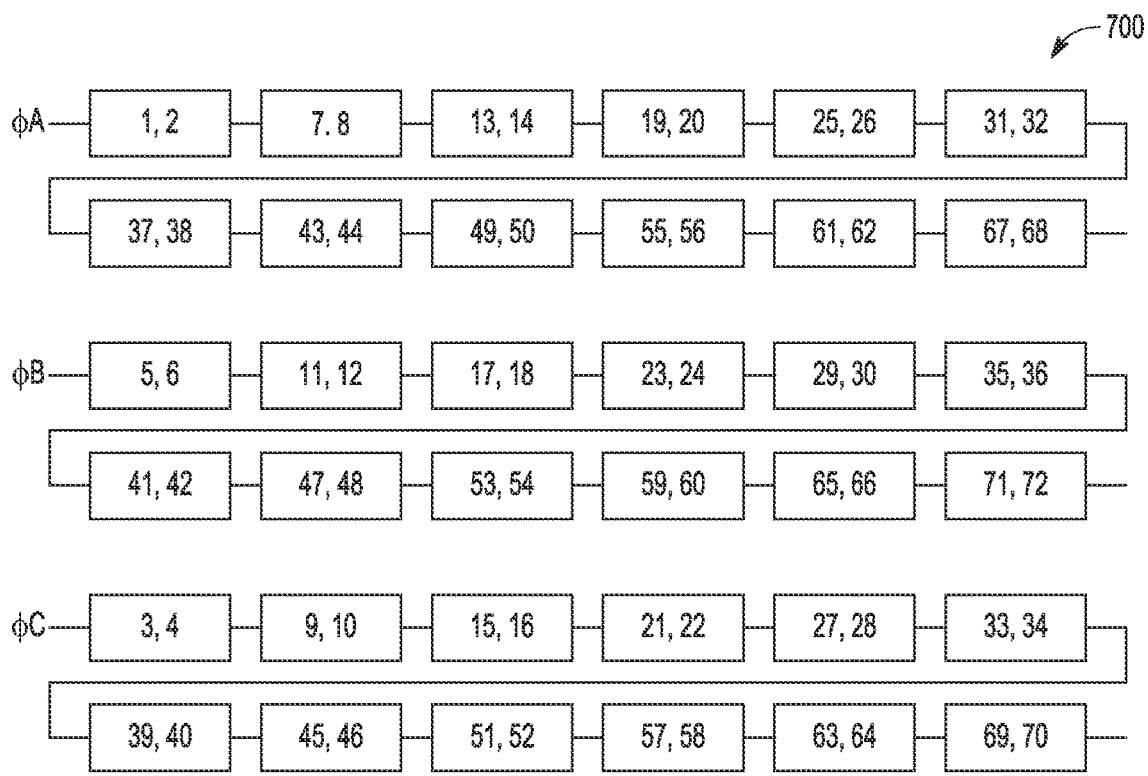
FIGS. 7A-7D are winding diagrams for the primary, secondary and 6 tertiary windings of an embodiment of a 12-pole WRIM with six isolated energy storage ports.

As shown in FIG. 7A, a 12 pole primary (stator) winding 700 in a wound-rotor induction machine has 72 total stator slots and 72 coils in the primary winding arranged for a 3-phase input. Each phase has all coils in series connection as 24 coils per phase. There are 2 slots/pole/phase, which indicates that 2 coils are wound in the same direction for one set then the direction of winding alternates for the next two coils in a set. For example coils 1 & 2 are wound clockwise and coils 7&8 are wound counter-clockwise with a repeatable pattern. The primary coils are evenly distributed around the machine periphery. The preferred coils are lap wound and double-layer as described in prior art machine literature. Typical conductor material is either stranded insulated copper wire or stranded insulated aluminum wire. Each phase is terminated in a wye or star-point neutral connection. The invention is equally applicable if the coils are arranged in delta configuration and also in a two-phase or higher than 3-phase configuration. The primary winding can be wound in the bottom layer of the stator slots and the tertiary windings can be wound in the top layer in a preferred embodiment.

Figure 7B:
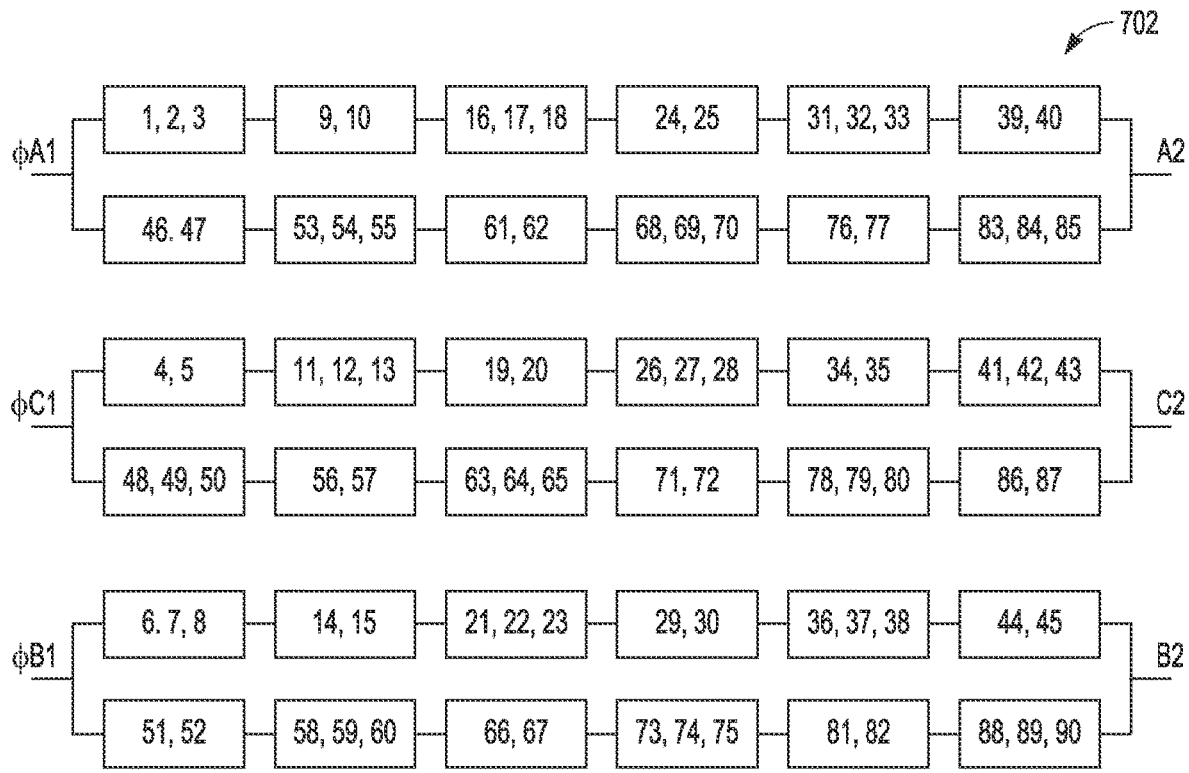

As shown in FIG. 7B, a 12-pole secondary (rotor) winding 702 has a 90 total rotor slots and 90 coils in the secondary winding arranged for a 3-phase input. Each phase has two groups in parallel with 15 coils per group. There are 2.5 slots/pole/phase, which indicates that either 2 or 3 coils are wound in same direction for one set then the direction of wind alternates for the next coils in a set. All coils may have the same number of turns and conductor cross section. For example coils 1, 2 &3 ("south poles") are wound clockwise and coils 9 & 10 ("north poles") are wound counter-clockwise with a repeatable pattern. The secondary coils are evenly distributed around the machine rotor periphery of 360 degrees. The preferred coils are either concentric-wound or lap-wound double-layer as described in prior art machine literature. Typical conductor material is either stranded insulated copper wire or stranded insulated aluminum wire. Each phase is terminated in a delta connection. To access the 3 slip rings of the machine for excitation input, terminal A1 is connected to C2, terminal C1 is connected to B2 and terminal B1 is connected to terminal A2.

Figure 7C:
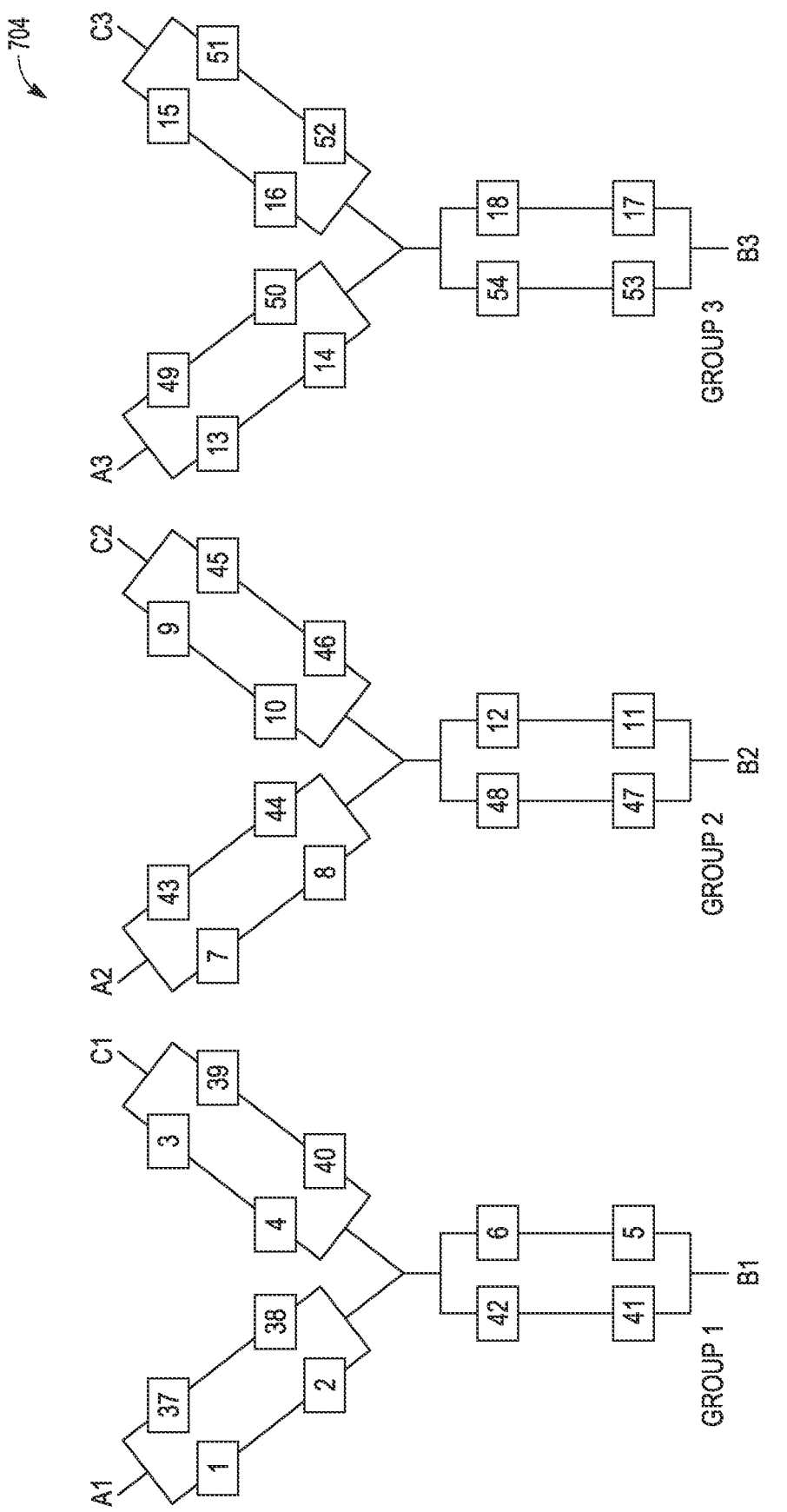
Figure 7D:
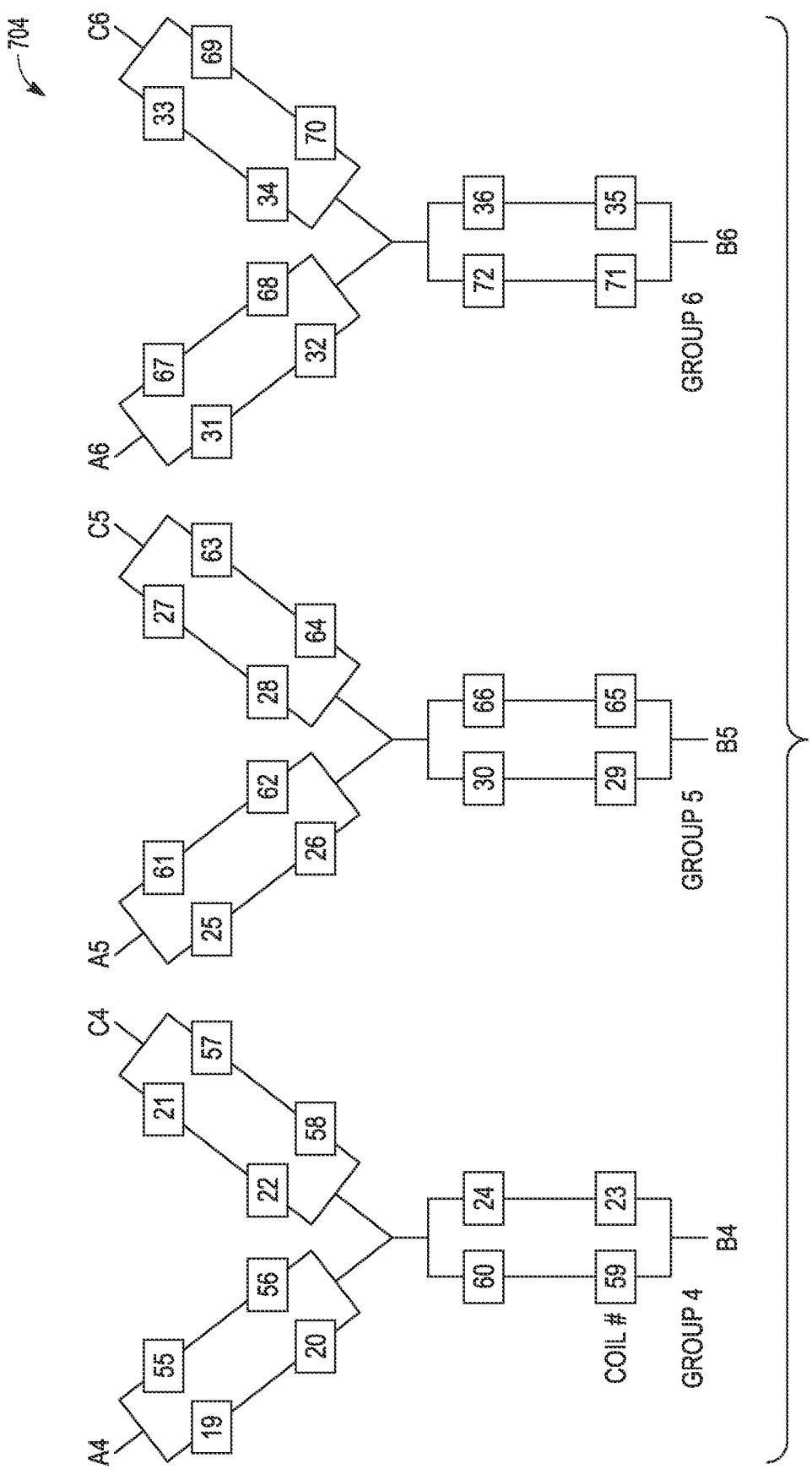

As shown in FIGS. 7C-7D, six tertiary alternating-current windings 704 of the main electrical machine are used to access the energy storage units (ESEs) through individual AC/DC power converters. Each one of the 6 groups occupies 2 poles or 60 degrees of stator slot periphery. There are a total of 12 poles. The numbers on the diagram blocks correspond to actual tertiary coil numbers connected as coils 1-72 arranged in order around the periphery. The preferred embodiment has 72 total stator slots. The coils are arranged in wye connection with two parallel groups per phase. Each group has a total of 12 coils whereby the design number is q=2 slots/pole/phase since this is a 3-phase winding. The turns per coil are not specified since this is dependent on exactly what type of energy storage unit is used, e.g. an electrochemical battery or an electrostatic capacitor. In general, these coils are intended for low-voltage high-current service. The preferred coils are lap-wound and double-layer as described in prior art machine literature. Typical conductor material is either stranded copper wire or stranded aluminum wire. Coils 1-18 and 19-36 are wound for "north poles" and coils 37-54 and 55-72 are wound for "south" poles, which defines the relative direction of current flow in producing an alternating magnetic field. The invention is equally applicable if the coils are arranged in delta configuration and also in a two-phase or higher than 3-phase configuration. The preferred embodiment has the tertiary winding sharing common stator slots with the primary winding.

Design Tables 800, 802, and 804 for a particular embodiment of the Primary (stator), Secondary (rotor) and Tertiary windings of the 12-pole 72/90 slot WRIM with 6 tertiary winding groups are shown in FIGS. 8A-8C.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

I claim:

1. An energy storage power source, comprising:
   a machine input configured to receive a variable AC input voltage Vin at a variable frequency;
   a wound-rotor induction machine (WRIM) including a primary winding that is wound 360 degrees around a first magnetic core and coupled to the input to receive the AC input voltage Vin, a secondary winding that is wound 360 degrees around a second magnetic core configured to rotate relative to the first magnetic core and coupled to a load producing output and N tertiary windings each wound 360/N and distributed around the first magnetic core and magnetically coupled to both the primary and secondary windings;
   N energy storage elements (ESEs);

N bi-directional AC/DC converters that each couple one of the tertiary windings to a respective one of the ESEs; and a WRIM controller, wherein in a charging state, the AC input voltage is coupled to the primary winding to create a traveling magnetic field to provide relative rotation between the first and second magnetic cores and to magnetize the tertiary windings to provide power through the AC/DC converters to selectively charge one or more of the N ESEs; and wherein in a discharge state, one or more of the N ESEs discharge energy back through the respective AC/DC converters to excite the respective tertiary windings to create a traveling magnetic field to magnetize an airgap to assist the relative rotation between the first and second magnetic cores and to individually contribute to a total machine magnetic flux to magnetize the secondary winding to induce an AC output voltage on the secondary winding proportional to the sum of the voltages from the discharging ESEs and deliver energy to the load producing output.

2. The energy storage power source of claim 1, further comprising:

an AC/AC converter that is configured to receive an AC voltage at a fixed frequency f1 from an external AC power source and convert that AC voltage into the variable AC input voltage at variable frequency f2 at the input.

3. The energy storage power source of claim 1, further comprising:

a DC/AC converter that is configured to receive a DC voltage from an external DC power source and convert that DC voltage into the variable AC input voltage at variable frequency at the input.

4. The energy storage power source of claim 1, wherein the AC output voltage is scaled by a transformation ratio determined by turns ratios of the secondary winding to the N tertiary windings.

5. The energy storage power source of claim 4, wherein the transformation ratio is on average for all N ESEs greater than 1:1 to increase the AC output voltage.

6. The energy storage power source of claim 1, wherein the load producing output is configured for a bi-directional flow of energy, wherein the WRIM is configured to selectively receive energy from the load producing output to charge the ESEs.

7. The energy storage power source of claim 6, further comprising:

a flywheel coupled to the second magnetic core, said flywheel configured to selectively store energy from the AC input voltage, the ESEs or the load producing output via the secondary winding and to selectively deliver energy to at least the ESEs and the load producing output via the secondary winding.

8. The energy storage power source of claim 6, wherein the machine energy input is configured for a bi-directional flow of energy, wherein the WRIM is configured to receive energy from the load producing output and deliver the energy back to the input.

9. The energy storage power source of claim 1, wherein the N ESEs are electrically isolated from each other and the primary, secondary and N tertiary windings are electrically isolated from each other.

10. The energy storage power source of claim 1, wherein a primary-to-tertiary turns ratio Np/Nt(i) for i=1 to N is independently configured to deliver a specified DC voltage VDC(i) to each of the N ESEs.

11. The energy storage power source of claim 1, wherein the N bi-directional AC/DC converters are independently controllable to selectively charge one or more ESEs exclusively or (XOR) independently controllable to selectively discharge the one or more ESEs.

12. The energy storage power source of claim 1, wherein the primary winding is segmented into M primary windings, each primary winding is coupled to a respective machine energy input to receive the AC input voltage, each primary winding is magnetically coupled to one or more of the tertiary windings, wherein the WRIM controller is configurable to simultaneously charge one or more ESEs coupled to a first subset of the M primary windings and to discharge one or more ESEs coupled to a second subset of the M primary windings in which the first and second subsets do not overlap.

13. The energy storage power source of claim 1, further comprising:

a load factor power controller coupled to the load producing output to modulate an inductive-resistive load to actively adjust a power factor of the WRIM to vary a rotational speed and maintain the AC output voltage within a specified tolerance of a target voltage.

14. The energy storage power source of claim 1, further comprising:

a flywheel coupled to the second magnetic core to store energy and to deliver kinetic energy to the ESEs or the load producing output.

15. The energy storage power source of claim 14, wherein the WRIM controller is configured to discharge one or more ESEs to deliver energy to the load producing output with a first time constant and decelerate the flywheel to deliver energy to the load producing output at a second time constant wherein the second time constant is longer than said first time constant.

16. The energy storage power source of claim 1, wherein in the discharging state the WRIM controller is configured to selectively decouple the AC input voltage from the primary winding.

17. The energy storage power source of claim 1, wherein in the discharging state the WRIM controller is configured to leave the AC input voltage coupled to the primary winding to deliver additional energy via the secondary winding to the load producing output.

18. An energy storage power source, comprising:

a machine input configured to receive a variable AC input voltage Vin at a variable frequency;

a wound-rotor induction machine (WRIM) including a primary winding that is wound 360 degrees around a first magnetic core and coupled to the input to receive the AC input voltage Vin, a secondary winding that is wound 360 degrees around a second magnetic core configured to rotate relative to the first magnetic core and coupled to a load producing output and N tertiary windings each wound 360/N and distributed around the first magnetic core and magnetically coupled to both the primary and secondary windings, wherein a turns ratio of a number of secondary turns Ns to a number of tertiary turns Nt(i) i=1 to N defines an average step-up transformation ratio greater than one;

a flywheel mechanically coupled to the second magnetic core;

N energy storage elements (ESEs) that are electrically isolated from each other;

N bi-directional AC/DC converters that each couple one of the tertiary winding to a respective one of the ESEs; and a WRIM controller, wherein in one or more charging states, the AC input voltage is coupled to the primary winding to create a traveling magnetic field to provide the relative rotation between the first and second magnetic cores and to magnetize the tertiary windings to provide power through the AC/DC converters to selectively charge one or more of the N ESEs or to magnetize the secondary winding and create torque to charge the flywheel; and wherein in one or more discharge states, one or more of the N ESEs discharge back through the respective AC/DC converters to excite the respective tertiary windings to create a traveling magnetic field to magnetize an airgap to assist the relative rotation between the first and second magnetic cores and to individually contribute to a total machine magnetic flux to magnetize the secondary winding to induce an AC output voltage on the secondary winding proportional to the sum of the voltages from the discharging ESEs multiplied by the respective step-up transformation ratios and deliver the energy to the load producing output or the flywheel discharges energy through the secondary winding to the load producing output.

19. An energy storage power source, comprising:

a wound-rotor induction machine (WRIM) including N tertiary windings each wound 360/N and distributed around a first magnetic core and a secondary winding that is wound 360 degrees around a second magnetic core configured to rotate relative to the first magnetic core and coupled to a load producing output;

N energy storage elements (ESEs);

N bi-directional AC/DC converters that each couple one of the tertiary winding to a respective one of the energy storage elements;

a WRIM controller, wherein in a charging state, an external power source is coupled to the WRIM to create a traveling magnetic field to provide the relative rotation between the first and second magnetic cores and to magnetize the tertiary windings to provide power through the AC/DC converters to selectively charge the N ESEs; and wherein in a discharge state, at least some of the N energy storage elements discharging back through the AC/DC converters are used to excite the tertiary windings to create a traveling magnetic field to magnetize an airgap to assist the relative rotation between the first and second magnetic cores and to individually contribute to a total machine magnetic flux to magnetize the secondary winding to induce an AC output voltage on the secondary winding proportional to the sum of the voltages from the discharging energy storage elements and deliver the energy to the load producing output.

20. The energy storage power source of claim 19, wherein the voltages from the discharging ESEs are multiplied by respective transformation ratios associated with turns ratios of the secondary winding to the respective tertiary windings and summed to deliver the energy to the load producing output, wherein the N ESEs are electrically isolated from each other, wherein energy flows bi-directionally at each of the N ESEs and the load producing output.

\* \* \* \* \*

UNITED STATES PATENT AND TRADEMARK OFFICE
CERTIFICATE OF CORRECTION

| | | |
|---|---|---|
| PATENT NO. | : 12,136,844 B2 | Page 1 of 1 |
| APPLICATION NO. | : 17/557758 | |
| DATED | : November 5, 2024 | |
| INVENTOR(S) | : Kuznetsov | |

It is certified that error appears in the above-identified patent and that said Letters Patent is hereby corrected as shown below:

In the Specification

In Column 4, Line 4, delete "which." and insert --which:-- therefor

In Column 4, Line 52, delete "WRLM" and insert --WRIM-- therefor

In Column 7, Line 42, delete "200" and insert --202-- therefor

In Column 11, Line 66, delete "Koss," and insert --Kloss,-- therefor

In Column 12, Line 20, delete "Koss," and insert --Kloss,-- therefor

Signed and Sealed this
Tenth Day of February, 2026

John A. Squires
*Director of the United States Patent and Trademark Office*